US011268165B2

(12) United States Patent
Duan et al.

(10) Patent No.: US 11,268,165 B2
(45) Date of Patent: Mar. 8, 2022

(54) HOMOGENIZATION PROCESS FOR COILED TUBING

(71) Applicant: Shinda (Tangshan) Creative Oil & Gas Equipment Co., Ltd., Tangshan (CN)

(72) Inventors: Jianliang Duan, Tangshan (CN); Jian Dong, Tangshan (CN); Shujun Zhang, Tangshan (CN); Bin Zheng, Tangshan (CN); Fengshou Shangguan, Tangshan (CN); Yueqing Lin, Tangshan (CN); Xiang Liu, Tangshan (CN); Yali Zhang, Tangshan (CN)

(73) Assignee: SHINDA (TANGSHAN) CREATIVE OIL & GAS EQUIPMENT CO., LTD., Tangshan (CN)

( * ) Notice: Subject to any disclaimer, the term of this patent is extended or adjusted under 35 U.S.C. 154(b) by 205 days.

(21) Appl. No.: 16/359,177

(22) Filed: Mar. 20, 2019

(65) Prior Publication Data

US 2020/0181730 A1    Jun. 11, 2020

(30) Foreign Application Priority Data

Dec. 11, 2018  (CN) .......................... 201811510771.X

(51) Int. Cl.
*C21D 9/50*        (2006.01)
*C21D 1/26*        (2006.01)
(Continued)

(52) U.S. Cl.
CPC ............... *C21D 9/505* (2013.01); *C21D 1/26* (2013.01); *C21D 1/42* (2013.01); *C21D 1/60* (2013.01);
(Continued)

(58) Field of Classification Search
CPC . C21D 9/14; C21D 9/50; C21D 9/505; C21D 1/26; C21D 1/42; C21D 1/60;
(Continued)

(56) References Cited

U.S. PATENT DOCUMENTS 1,997,538 A  *  4/1935  Armstrong  ........... B23K 20/227
                                                     428/638
3,568,012 A  *  3/1971  Ernst  ....................... C08L 79/08
                                                     257/786
(Continued)

FOREIGN PATENT DOCUMENTS

CN      101220408 A     7/2008
CN      103266217 A     8/2013
(Continued)

OTHER PUBLICATIONS

Tilekar, Amey; Kamble, Nitin. "Optimization of Laser Welding Parameters: A Review." Jun. 2017. IRJET, 4(6) 1631-1633. (Year: 2017).*

(Continued)

*Primary Examiner* — Alexandra M Moore
*Assistant Examiner* — Adil A. Siddiqui
(74) *Attorney, Agent, or Firm* — Wood Herron & Evans LLP

(57) ABSTRACT

A homogenization process for coiled tubing is provided. After being preheated in a sectional manner and quenched and tempered, laser-welded low-carbon alloy steel coiled tubing is spray cooled, and then is tempered to obtain homogeneous silvery coiled tubing. Microstructural uniformity of the silvery coiled tubing after the treatment is greatly improved in a welding seam region, a heat sensing region, and a tube wall, situations in which an outer surface of the coiled tubing is burnt and oxidized in the homogenization process are reduced, and a service life of the coiled tubing (Continued)

is prolonged. Moreover, homogeneous coiled tubing with different yield strengths and tensile strengths can be obtained by changing a temperature of the tempering, so that production costs are reduced.

8 Claims, 3 Drawing Sheets

(51) Int. Cl.

| | |
|---|---|
| C21D 1/42 | (2006.01) |
| C21D 1/60 | (2006.01) |
| C21D 1/667 | (2006.01) |
| C21D 9/08 | (2006.01) |
| C22C 38/00 | (2006.01) |
| C22C 38/02 | (2006.01) |
| C22C 38/04 | (2006.01) |
| C22C 38/22 | (2006.01) |
| C22C 38/24 | (2006.01) |
| C22C 38/26 | (2006.01) |
| C22C 38/28 | (2006.01) |
| C22C 38/32 | (2006.01) |
| C23G 1/08 | (2006.01) |

(52) U.S. Cl.
CPC .............. *C21D 1/667* (2013.01); *C21D 9/08* (2013.01); *C22C 38/002* (2013.01); *C22C 38/02* (2013.01); *C22C 38/04* (2013.01); *C22C 38/22* (2013.01); *C22C 38/24* (2013.01); *C22C 38/26* (2013.01); *C22C 38/28* (2013.01); *C22C 38/32* (2013.01); *C23G 1/08* (2013.01)

(58) Field of Classification Search
CPC .......... C21D 1/667; C21D 9/08; C21D 11/00; C22C 38/002; C22C 38/02; C22C 38/04; C22C 38/22; C22C 38/24; C22C 38/26; C22C 38/28; C22C 38/32; C23G 1/08; Y02P 10/25; F16L 11/14
See application file for complete search history.

(56) References Cited

U.S. PATENT DOCUMENTS

| | | | | |
|---|---|---|---|---|
| 5,750,955 | A * | 5/1998 | Yoshino | ................. B23K 10/02 |
| | | | | 219/121.46 |
| 2012/0138586 | A1* | 6/2012 | Webster | .................... C22F 3/00 |
| | | | | 219/121.64 |
| 2014/0272448 | A1* | 9/2014 | Valdez | .................... C21D 8/105 |
| | | | | 428/592 |
| 2015/0001089 | A1* | 1/2015 | Matusch | ................. C25D 5/505 |
| | | | | 205/154 |
| 2017/0350434 | A1* | 12/2017 | Maruyama | ............. B21D 22/02 |
| 2018/0002198 | A1* | 1/2018 | Lane | ......................... B67D 7/80 |
| 2018/0200770 | A1* | 7/2018 | Rowland | .................. C21D 1/18 |
| 2019/0084074 | A1* | 3/2019 | Branagan | ............. B23K 26/322 |
| 2019/0085424 | A1* | 3/2019 | Uematsu | ................ C21D 9/085 |
| 2020/0123626 | A1* | 4/2020 | Takebayashi | ........ C21D 8/1255 |
| 2020/0291501 | A1* | 9/2020 | Zhang | ...................... C21D 9/62 |

FOREIGN PATENT DOCUMENTS

| | | |
|---|---|---|
| CN | 104178717 A | 12/2014 |
| CN | 104259206 A | 1/2015 |
| CN | 104046918 B | 10/2017 |
| CN | 105458633 B | 12/2017 |

OTHER PUBLICATIONS

Ericsson, Clyde E.; Bhat, M.S.; Parker, Earl R.; Zackay, Victor F. "Isothermal Studies of Bainitic and Martensitic Transformations in Some Low Alloy Steels." Nov. 1976. Metallurgical Transactions, 7 1800-1803. (Year: 1976).*

* cited by examiner

HOMOGENIZATION PROCESS FOR COILED TUBING

CROSS-REFERENCE TO RELATED APPLICATION

This application claims priority to Chinese application number 201811510771.X, filed on Dec. 11, 2018. The above-mentioned patent application is incorporated herein by reference in its entirety.

TECHNICAL FIELD

The present invention relates to the field of tubing machining technologies, and more particularly, relates to a homogenization process used with tubing.

BACKGROUND

Coiled tubing is tubing made of low-carbon alloy steel, has good flexibility, and is also referred to as flexible tubing. A roll of coiled tubing is thousands of meters long and can be used to replace conventional tubing for many operations. When coiled tubing is used for operation, the coiled tubing needs to be subject to many plastic deformations. Therefore, the coiled tubing needs to have relatively high fatigue strength and a relatively long service life. When a part with a defect, such as heterogeneity, appears in conventional coiled tubing, usually a defective part is cut off, and then, the tubing is used after tube-to-tube welding is performed thereon. Moreover, when the welded tubing is used for operation, technical problems, such as welding point disconnection, may also appear. A service life of tubing is greatly reduced. How to prepare homogeneous coiled tubing is a problem urgently to be resolved currently in the industry. Several examples are known from the conventional art as follows.

The Chinese Patent Application No. 104178717A discloses a thermal treatment method for titanium alloy tubing. Recrystallization annealing is first performed on titanium alloy tubing by using a quenching furnace, then, air-cooling is performed, and treatment is performed in a quenching apparatus, further, heat is preserved in a tempering furnace, and finally, straightening and cooling are performed. This process is a novel thermal treatment process proposed for a difficulty in subsequent thermal straightening because a degree of curvature of small-caliber titanium alloy tubing is increased after thermal treatment.

The Chinese Patent Application No. 101220408A discloses an electric-heating and quenching and tempering thermal treatment method and apparatus for tubing. First, tubing is conveyed into a quenching furnace and heated, where a heating temperature ranges from 850 to 1000° C., the heated steel pipe is spray cooled by cold water, and after the cooling, thermal treatment is further performed in a tempering furnace, where a heating temperature ranges from 500 to 800° C. This process makes inner and outer surfaces of the tubing smooth without oxidation, so that comprehensive mechanical properties, such as strength and tenacity, of the tubing are significantly improved.

The Chinese Patent Application No. 103266217A discloses a reinforcing thermal treatment process for a pipe end of a petroleum steel pipe in a quenching and tempering condition. This process includes S1: quenching and tempering a whole pipe in a first stage; and S2: performing secondary tempering on a middle portion of a pipe body of the steel pipe obtained in step S1. An objective of the performing secondary tempering on a middle portion of a pipe body of the steel pipe is reducing strength of the middle portion of the steel pipe, to achieve strength performance of a final product.

The Chinese Patent Application No. 104259206A discloses a production method of titanium alloy seamless tubes used for tubing coupling, where its production process sequentially includes "annular furnace heating, cross piercing, non-mandrel tube rolling, and heating furnace heating and sizing". The titanium alloy seamless tubes produced according to the process can be directly subject to machining by a tubing coupling machine without being subject to thermal treatment.

The Chinese Patent No. 104046918B discloses a high performance material for coiled tubing applications and a method of producing the same, where low-carbon alloy steel is used, is subject to full body heat treatment, and includes a mixture of tempered martensite and bainite; where a final microstructure of the coiled tubing includes more than 90 volume % tempered martensite in base metal regions, bias weld joints, and heat affected zones; where the final microstructure across all base metal regions, bias weld joints, and heat affected zones is homogeneous; and where the final microstructure includes uniform distribution of fine carbides across the base metal regions, the bias weld joints, and the heat affected zones. However, it is difficult to obtain homogeneous coiled tubing by using other low-carbon alloy steel by the foregoing process.

Preparing coiled tubing by laser welding is a method of personnel for preparing coiled tubing by highly efficient and precise welding by using a laser beam with high energy density. An inner burr problem and a grooving corrosion problem can be overcome in coiled tubing prepared by laser welding. However, homogenizing laser-welded coiled tubing is a problem urgently to be resolved currently. Meanwhile, costs of laser-welded coiled tubing are high. After performing thermal treatment on the laser-welded coiled tubing, obtaining homogeneous coiled tubing having different yield strengths and tensile strengths, to satisfy different operation requirements and reduce production costs, is also a difficult problem of the industry.

Therefore, it would be desirable to provide a coiled tubing homogenization process, where laser-welded low-carbon alloy steel coiled tubing is pre-heated in a sectioned manner and quickly cooled after being quenched and tempered in a mixed atmosphere. It is desired to improve a conversion rate of austenite and to obtain coiled tubing having a homogeneous martensitic structure.

SUMMARY

To achieve the above purposes and solve the technical defects with the conventional methods as noted above, the present invention provides the following technical solution, in one embodiment. A homogenization process for coiled tubing is provided, including the following steps: (1) making laser-welded low-carbon alloy steel coiled tubing pass through an annealing furnace at a uniform velocity to perform heating and quenching and tempering, where sectioned heating is performed in the annealing furnace, a sectioned preheating region and a quenching and tempering region are sequentially disposed in the annealing furnace, a temperature of the sectioned preheating region ranges from 300° C. to 800° C., a temperature of the quenching and tempering region ranges from 900° C. to 950° C., a temperature raising process of the tubing can be accelerated, to heat the tubing more uniformly without generating a thermal deformation; in addition, there is more time for austenitization, to implement conversion of a whole austenitic structure; in the heating and quenching and tempering process, the atmosphere in the annealing furnace is a gas mixture of hydrogen and nitrogen, so that during the quenching and tempering, grains are refined, and the austenitic structure is distributed more uniformly, and meanwhile, oxide scale and a thin and weak exterior of the tubing are prevented during the process of heating the tubing; and during the whole heating and quenching and tempering process, the tubing passes through the annealing furnace at the uniform velocity, to prevent the tubing from having different calibers; (2) after the coiled tubing is heated and quenched and tempered, in the mixed atmosphere of hydrogen and nitrogen, immediately performing spray cooling to a temperature of 15° C. to 40° C., to obtain silvery coiled tubing (silvery tubing for short) of a martensitic structure, where a rate of the spray cooling ranges from 50° C./s to 80° C./s; (3) making the silvery tubing cooled in step (2) pass through an intermediate frequency coil under the protection of an atmosphere of nitrogen at a uniform velocity, to perform rapid tempering, where a color of the tempered silvery tubing is kept unchanged, and a length of the intermediate frequency coil is 50 cm; tubing stress may be removed by the tempering process while preventing inconsistency in calibers of the tubing and a change in a length of the tubing when the tubing is heated for a long time, thereby ensuring uniformity of an outer diameter of the tubing; and performing tempering in the atmosphere of nitrogen can prevent a surface of the silvery tubing from being oxidized, thereby improving a service life of the coiled tubing; and (4) water cooling.

In one aspect, specific preparation steps of the laser-welded low-carbon alloy steel coiled tubing are as follows: performing surface cleaning on low-carbon alloy steel tubing sections to remove a rustproof coating and surface impurities; butt-welding the cleaned tubing sections into one piece by using a laser welding method, where a diameter of a facula of the laser welding is 2 mm, a welding power is 7000 W, a focal distance is 230 mm, a welding speed is 3 meter/minute, and during the welding, argon is used as a protective gas; and polishing a surface of a welding seam region of the laser-welded tubing to make it smooth.

Before butt-welding the tubing by laser, cleaning surfaces of weldments should be performed, to effectively reduce a quantity of generated air pores on a welding seam surface, improve compactness of the tubing, and prevent pipeline leakage. In examples of the present invention, the low-carbon alloy steel tubing is first degreased by using an anionic surfactant (preferably, sodium dodecylbenzenesulfonate), then, is soaked in a diluted acid (preferably, an aqueous solution of hydrochloric acid whose mass concentration ranges from 10% to 15%) for 10 s to 30 s, to sufficiently remove the rustproof coating and impurities on the surface of the tubing, and finally, is ultrasonically cleaned by using water for 10 s to 30 s.

In another aspect, mass percentages of chemical components in the low-carbon alloy steel tubing are: C: 0.20% to 0.28%, Si: 0.12 to 0.20%, Mn: 1.00% to 1.80%, P: ≤0.015%, S: ≤0.005%, Cr: 0.30% to 0.80%, Mo: 0.20% to 0.60%, B: ≤0.0005%, Nb: 0.020% to 0.060%, Ti: 0.010% to 0.030%, V: 0.020% to 0.080%, and iron: the remainder.

Laser welding is performed on coiled tubing sections by using a laser welding machine, that is, the coiled tubing sections are butt-welded by laser. In all of the examples of the present invention, low-carbon alloy steel tubing sections having a size of Φ25.4 mm*2.8 mm (diameter*wall thickness) are welded by laser, a diameter of a facula of the laser welding is 2 mm, a welding power is 7000 W, a focal distance is 230 mm, a welding speed is 3 m/min, and during the welding, argon is used as a protective gas.

After the coiled tubing is formed by laser-welding, a further step is to polish a welding seam region of the tubing, to remove a burr of the welding seam region.

In a further aspect, a volume ratio of hydrogen and nitrogen in the mixed atmosphere in step (1) and step (2) is 3:1.

In yet another aspect, a sprayed medium used in the spray cooling in step (2) is softened water, and its pH values ranges from 7 to 8. The softened water has been subjected to softening treatment, where contents of magnesium salts and calcium salts are reduced to 1.0 mg/L to 50 mg/L. Using softened water as a sprayed medium can effectively prevent magnesium salts and calcium salts from infiltrating into the tubing and degrading performance of the tubing to different degrees. Using softened water whose pH value ranges from 7 to 8 can further improve mechanical performance of the tubing during spray cooling and prevent the exterior of the tubing from being oxidized.

In another aspect, the sectioned preheating region of the annealing furnace is equally divided into six sections for preheating, a temperature of a first section is 300° C., a temperature of a second section is 400° C., a temperature of a third section is 500° C., a temperature of a fourth section is 600° C., a temperature of a fifth section is 700° C., and a temperature of a sixth section is 800° C.

In yet another aspect, a temperature of the quenching and tempering region of the annealing furnace is 930° C.

In some embodiments, a temperature of the tempered coiled tubing ranges from 400° C. to 800° C.

The embodiments of the present invention provide the following beneficial effects. The homogenization process for coiled tubing of the present invention is unique. The laser-welded low-carbon alloy steel coiled tubing is preheated in a sectioned manner and quenched and tempered in the gas mixture of hydrogen and nitrogen, so that the tubing of the uniformly distributed austenitic structure can be obtained; further, the tubing is spray-cooled in the gas mixture of hydrogen and nitrogen to obtain homogeneous silvery coiled tubing (silvery tubing for short) of a martensitic structure. Stress of the silvery tubing may be quickly removed after the tempering. Microstructural uniformity of the silvery tubing after the treatment is greatly improved in a welding seam region, a heat sensing region, and a tube wall while prolonging a service life of the silvery tubing. In addition, a production process is simplified, and homogeneous coiled tubing with different yield strengths and tensile strengths can be obtained by changing a temperature of the tempering, so that operation requirements are satisfied while reducing production costs. In the present invention, homogeneous coiled tubing can be obtained by performing thermal treatment on laser-welded low-carbon alloy steel coiled tubing having different components.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitutes a part of this specification, illustrate one or more embodiments of the invention and, together with the general description given above and the detailed description given below, explain the one or more embodiments of the invention.

DETAILED DESCRIPTION

The following clearly and completely describes the technical solutions in the embodiments of the present invention with reference to the accompanying drawings in the embodiments of the present invention. To make objectives, features, and advantages of the present invention clearer, the following describes embodiments of the present invention in more detail with reference to accompanying drawings and specific implementations.

Example 1

A homogenization process for coiled tubing included the following specific steps. Surface cleaning was performed on low-carbon alloy steel tubing whose size was Φ25.4 mm*2.8 mm (diameter*wall thickness) and whose mass percentages of chemical components were: C: 0.25%, Si: 0.15%, Mn: 1.50%, P: 0.010%, S: 0.005%, Cr: 0.05%, Mo: 0.5%, B: 0.0005%, Nb: 0.050%, Ti: 0.020%, V: 0.050%, and iron: the remainder, to remove a rustproof coating and surface impurities. Specifically, tubing sections were cleaned and degreased by using sodium dodecylbenzenesulfonate, were soaked in an aqueous solution of hydrochloric acid whose mass concentration was 10% for 30 s, to sufficiently remove the rustproof coating and impurities on the surface of the tubing, and finally, were ultrasonically cleaned by using water for 30 s.

(1) The cleaned tubing sections were butt-welded into one piece by using a laser welding method. A diameter of a facula of the laser welding was 2 mm, a welding power was 7000 W, a focal distance was 230 mm, a welding speed was 3 meter/minute, and during the welding, argon was used as a protective gas.

Figure 1:
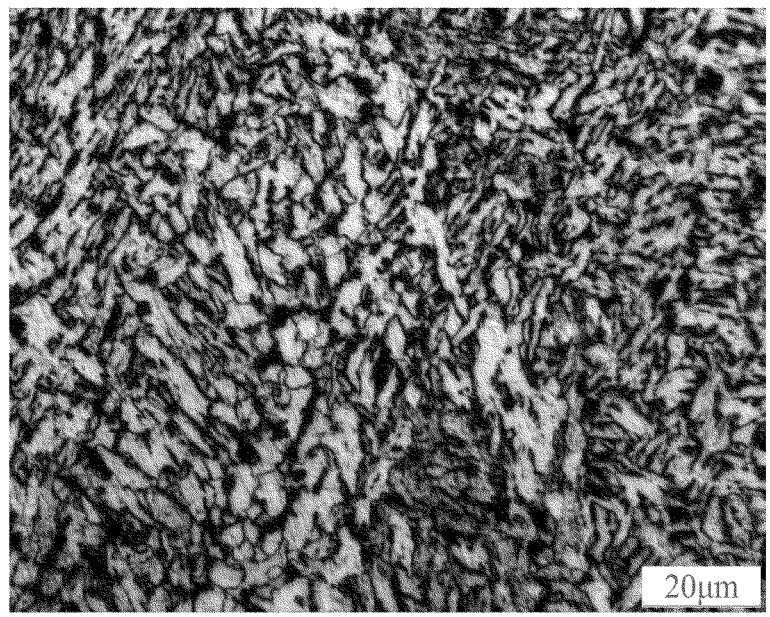
FIG. 1 is a Scanning Electron Microscope (SEM)-generated diagram of a welding seam region of coiled tubing before homogenization in accordance with one embodiment of the present invention described below as Example 1.
Figure 2:
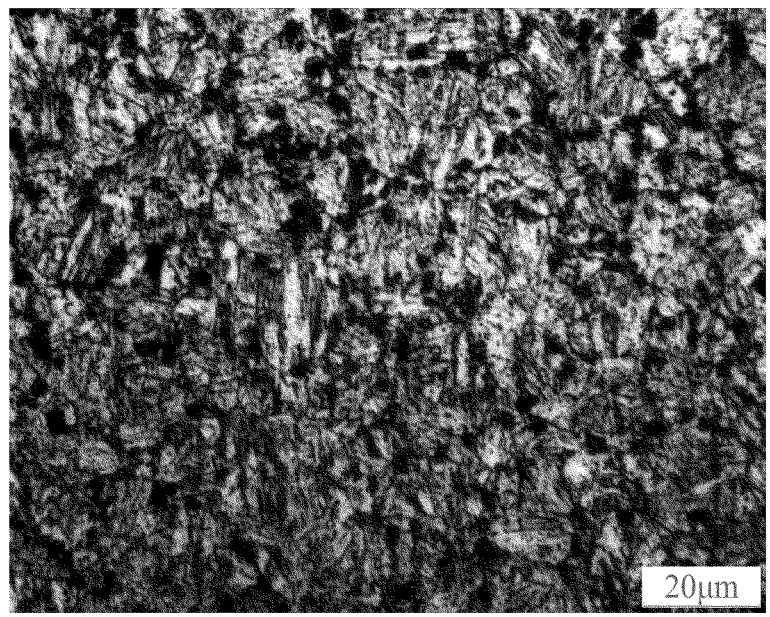
FIG. 2 is a SEM-generated diagram of a heat sensing region of coiled tubing before homogenization according to Example 1.
Figure 3:
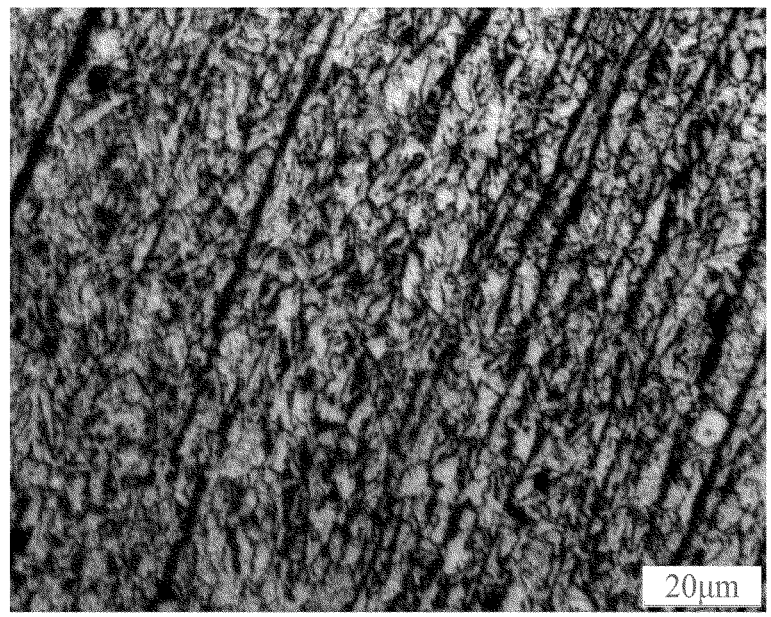
FIG. 3 is a SEM-generated diagram of a base material of a tube wall of coiled tubing before homogenization according to Example 1.

(2) A surface of a welding seam region of the laser-welded tubing was polished to be smooth. After the tubing was polished to be smooth, microstructures were observed at three positions, namely, the welding seam region, a heat sensing region, and a base material of a tube wall, of the tubing. As shown in FIG. 1 to FIG. 3, yield strengths of strips at the foregoing three positions were respectively 820 MPa, 680 MPa, and 720 MPa.

(3) The coiled tubing after the treatment passed through an annealing furnace at a uniform velocity of 2 m/s to be heated and quenched and tempered. A length of the annealing furnace was 54 meters. A region of the first 18 meters was a preheating region, and the rest was a quenching and tempering region. The preheating region was equally divided into six sections for preheating. A temperature of a first section was 300° C., a temperature of a second section was 400° C., a temperature of a third section was 500° C., a temperature of a fourth section was 600° C., a temperature of a fifth section was 700° C., and a temperature of a sixth section was 800° C. A temperature of the quenching and tempering region of the annealing furnace was 930° C. When the coiled tubing was heated and quenched and tempered by using the foregoing annealing furnace, an atmosphere in the annealing furnace was kept as a gas mixture of hydrogen and nitrogen having a volume ratio of 3:1.

(4) After the coiled tubing was heated and quenched and tempered, in the mixed atmosphere of hydrogen and nitrogen having a volume ratio of 3:1, spray cooling was immediately performed to a temperature of 30° C., to obtain silvery coiled tubing (silvery tubing for short), where a rate of the spray cooling was 60° C./s.

(5) The silvery tubing cooled in step (4) passed through an intermediate frequency coil having a length of 50 cm in an atmosphere of nitrogen at a uniform velocity of 2 m/s, for rapid tempering, to heat the silvery tubing to 400° C.

(6) Water cooling as performed.

Figure 4:
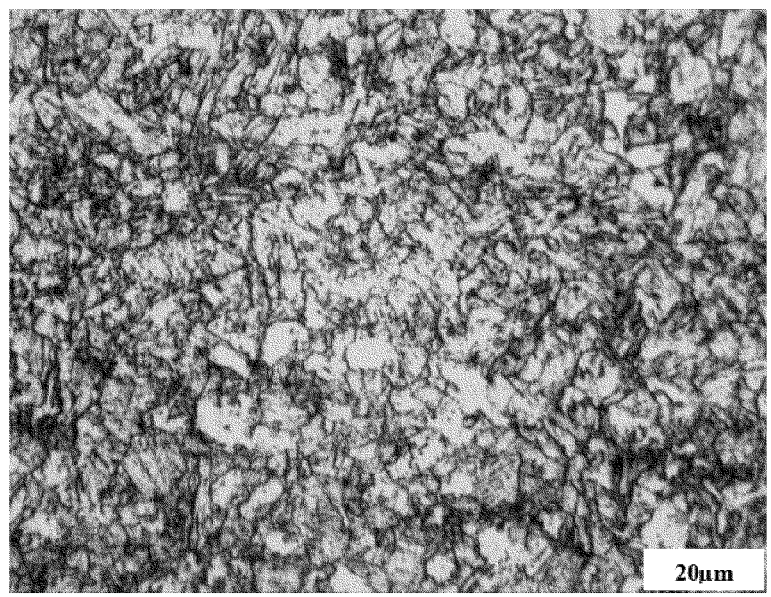
FIG. 4 is a SEM-generated diagram of a welding seam region of silvery tubing after homogenization according to Example 1.
Figure 5:
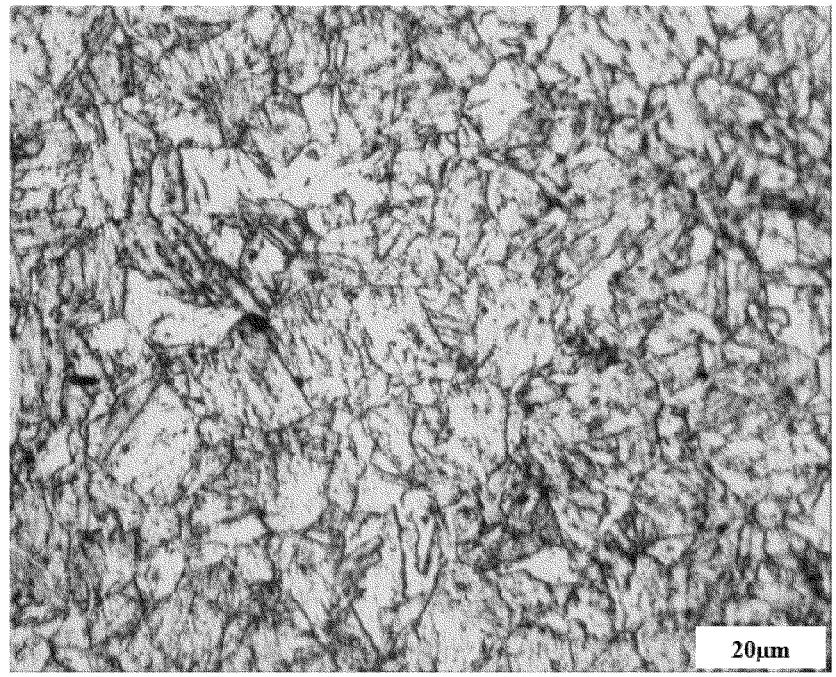
FIG. 5 is a SEM-generated diagram of a heat sensing region of silvery tubing after homogenization according to Example 1.
Figure 6:
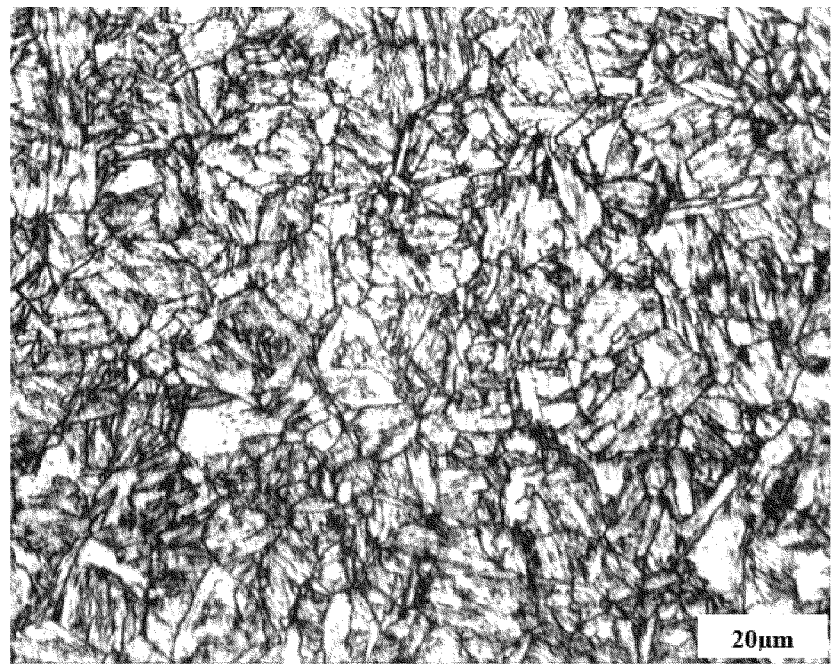
FIG. 6 is a SEM-generated diagram of a base material of a tube wall of silvery tubing after homogenization according to Example 1.

In view of FIG. 4 to FIG. 6, a structure of the silvery tubing obtained after the treatment of steps (4) to (7) was notably improved. Structures at respective positions of the welding seam region, the heat sensing region, and the tube wall of the tubing were more uniform and were further refined. Their sizes were all less than 20 μm. A structure of the welding seam region thereof was notably improved, so that the silvery tubing was more homogeneous overall.

Yield strengths at the three positions, namely, the welding seam region, the heat sensing region, and the tube wall, of the silvery tubing obtained by performing treatment of steps (4) to (7) on the laser-welded tubing were consistent and were all 1099 MPa. Moreover, a yield strength of the welding seam region was improved by 279 MPa, and yield strengths of the heat sensing region and the tube wall were respectively improved by 419 MPa and 379 MPa.

Example 2

A homogenization process for coiled tubing included the following specific steps.

(1) Surface cleaning was performed on low-carbon alloy steel tubing whose size was Φ25.4 mm*2.8 mm (diameter*wall thickness) and whose mass percentages of chemical components were: C: 0.20%, Si: 0.12%, Mn: 1.00%, P: 0.015%, S: 0.005%, Cr: 0.30%, Mo: 0.20%, B: 0.0005%, Nb: 0.020%, Ti: 0.01%, V: 0.020%, and iron: the remainder, to remove a rustproof coating and surface impurities. Specifically, tubing sections were cleaned and degreased by using sodium dodecylbenzenesulfonate, were soaked in an aqueous solution of hydrochloric acid whose mass concentration was 15% for 10 s, to sufficiently remove the rustproof coating and impurities on the surface of the tubing, and finally, were ultrasonically cleaned by using water for 30 s.

(2) The cleaned tubing sections were butt-welded into one piece by using a laser welding method. A diameter of a facula of the laser welding was 2 mm, a welding power was 7000 W, a focal distance was 230 mm, a welding speed was 3 meter/minute, and during the welding, argon was used as a protective gas.

(3) A surface of a welding seam region of the laser-welded tubing was polished to be smooth. It was detected that yield strengths of strips at three positions, namely, the welding seam region, a heat sensing region, and a tube wall, of the coiled tubing were respectively 827 MPa, 689 MPa, and 723 MPa.

(4) The coiled tubing after the treatment passed through an annealing furnace at a uniform velocity of 2 m/s to be heated and quenched and tempered. A length of the annealing furnace was 54 meters. A region of the first 18 meters was a preheating region, and the rest was a quenching and tempering region. The preheating region was equally divided into six sections for preheating. A temperature of a first section was 300° C., a temperature of a second section was 400° C., a temperature of a third section was 500° C., a temperature of a fourth section was 600° C., a temperature of a fifth section was 700° C., and a temperature of a sixth section was 800° C. A temperature of the preheating region of the annealing furnace was 930° C. When the coiled tubing was heated and quenched and tempered by using the foregoing annealing furnace, an atmosphere in the annealing furnace was kept as a gas mixture of hydrogen and nitrogen having a volume ratio of 3:1.

(5) After the coiled tubing was heated and quenched and tempered, in the mixed atmosphere of hydrogen and nitrogen having a volume ratio of 3:1, spray cooling was immediately performed to a temperature of 15° C., to obtain silvery coiled tubing (silvery tubing for short), where a rate of the spray cooling was 80° C./s.

(6) The silvery tubing cooled in step (5) passed through an intermediate frequency coil having a length of 50 cm in an atmosphere of nitrogen at a uniform velocity of 2 m/s, for rapid tempering, to heat the silvery tubing to 420° C.

(7) Water cooling was performed.

A structure of the silvery tubing obtained after the treatment of steps (4) to (7) was notably improved. Structures at respective positions of the welding seam region, the heat sensing region, and the tube wall of the tubing were more uniform and were refined. Their sizes were all less than 20 µm. A structure of the welding seam region was notably improved, so that the silvery tubing was more homogeneous overall.

Yield strengths at the three positions, namely, the welding seam region, the heat sensing region, and the tube wall, of the silvery tubing obtained by performing treatment of steps (4) to (7) on the laser-welded tubing were consistent and were all 1070 MPa. Moreover, a yield strength of the welding seam region was improved by 243 MPa, and yield strengths of the heat sensing region and the tube wall were respectively improved by 381 MPa and 347 MPa.

Example 3

A homogenization process for coiled tubing included the following specific steps.

(1) Surface cleaning was performed on low-carbon alloy steel tubing whose size was Φ25.4 mm*2.8 mm (diameter*wall thickness) and whose mass percentages of chemical components were: C: 0.28%, Si: 0.20%, Mn: 1.80%, P: 0.010%, S: 0.005%, Cr: 0.80%, Mo: 0.60%, B: 0.0005%, Nb: 0.060%, Ti: 0.030%, V: 0.080%, and iron: the remainder, to remove a rustproof coating and surface impurities. Specifically, tubing sections were cleaned and degreased by using sodium dodecylbenzenesulfonate, were soaked in an aqueous solution of hydrochloric acid whose mass concentration was 15% for 10 s, to sufficiently remove the rustproof coating and impurities on the surface of the tubing, and finally, were ultrasonically cleaned by using water for 30 s.

(2) The cleaned tubing sections were butt-welded into one piece by using a laser welding method. A diameter of a facula of the laser welding was 2 mm, a welding power was 7000 W, a focal distance was 230 mm, a welding speed was 3 meter/minute, and during the welding, argon was used as a protective gas.

(3) A surface of a welding seam region of the laser-welded tubing was polished to be smooth. It was detected that yield strengths of strips at three positions, namely, the welding seam region, a heat sensing region, and a tube wall, of the coiled tubing were respectively 820 MPa, 700 MPa, and 730 MPa.

(4) The coiled tubing after the treatment passed through an annealing furnace at a uniform velocity of 2 m/s to be heated and quenched and tempered. A length of the annealing furnace was 54 meters. A region of the first 18 meters was a preheating region, and the rest was a quenching and tempering region. The preheating region was equally divided into six sections for preheating. A temperature of a first section was 300° C., a temperature of a second section was 400° C., a temperature of a third section was 500° C., a temperature of a fourth section was 600° C., a temperature of a fifth section was 700° C., and a temperature of a sixth section was 800° C. A temperature of the preheating region of the annealing furnace was 930° C. When the coiled tubing was heated and quenched and tempered by using the foregoing annealing furnace, an atmosphere in the annealing furnace was kept as a gas mixture of hydrogen and nitrogen having a volume ratio of 3:1.

(5) After the coiled tubing was heated and quenched and tempered, in the mixed atmosphere of hydrogen and nitrogen having a volume ratio of 3:1, spray cooling was immediately performed to a temperature of 40° C., to obtain silvery coiled tubing, where a rate of the spray cooling was 50° C./s.

(6) The silvery tubing cooled in step (5) passed through an intermediate frequency coil having a length of 50 cm in an atmosphere of nitrogen at a uniform velocity of 2 m/s, for rapid tempering, to heat the silvery tubing to 520° C.

(7) Water cooling as performed.

A structure of the silvery tubing obtained after the treatment of steps (4) to (7) was notably improved. Structures at respective positions of the welding seam region, the heat sensing region, and the tube wall of the tubing were more uniform and were refined. Their sizes were all less than 20 µm. A structure of the welding seam region was notably improved, so that the silvery tubing was more homogeneous overall.

Yield strengths at the three positions, namely, the welding seam region, the heat sensing region, and the tube wall, of the silvery tubing obtained by performing treatment of steps (4) to (7) on the laser-welded tubing were basically consistent and were all 973 MPa.

Example 4

A homogenization process for coiled tubing included the following specific steps.

(1) Surface cleaning was performed on low-carbon alloy steel tubing whose size was Φ25.4 mm*2.8 mm (diameter*wall thickness) and whose mass percentages of chemical components were: C: 0.28%, Si: 0.15%, Mn: 1.42%, P: 0.014%, S: 0.003%, Cr: 0.060%, Mo: 0.30%, B: 0.0003%, Nb: 0.050%, Ti: 0.027%, V: 0.060%, and iron: the remainder, to remove a rustproof coating and surface impurities. Specifically, tubing sections were cleaned and degreased by using sodium dodecylbenzenesulfonate, were soaked in an aqueous solution of hydrochloric acid whose mass concentration was 12% for 20 s, to sufficiently remove the rustproof coating and impurities on the surface of the tubing, and finally, were ultrasonically cleaned by using water for 30 s.

(2) The cleaned tubing sections were butt-welded into one piece by using a laser welding method. A diameter of a facula of the laser welding was 2 mm, a welding power was 7000 W, a focal distance was 230 mm, a welding speed was 3 meter/minute, and during the welding, argon was used as a protective gas.

(3) A surface of a welding seam region of the laser-welded tubing was polished to be smooth. It was detected that yield strengths of strips at three positions, namely, the welding seam region, a heat sensing region, and a tube wall, of the coiled tubing were respectively 815 MPa, 685 MPa, and 725 MPa.

(4) The coiled tubing after the treatment passed through an annealing furnace at a uniform velocity of 2 m/s to be heated and quenched and tempered. A length of the annealing furnace was 54 meters. A region of the first 18 meters was a preheating region, and the rest was a quenching and tempering region. The preheating region was equally divided into six sections for preheating. A temperature of a first section was 300° C., a temperature of a second section was 400° C., a temperature of a third section was 500° C., a temperature of a fourth section was 600° C., a temperature of a fifth section was 700° C., and a temperature of a sixth section was 800° C. A temperature of the quenching and tempering region of the annealing furnace was 930° C. When the coiled tubing was heated and quenched and tempered by using the foregoing annealing furnace, an atmosphere in the annealing furnace was kept as a gas mixture of hydrogen and nitrogen having a volume ratio of 3:1.

(5) After the coiled tubing was heated and quenched and tempered, in the mixed atmosphere of hydrogen and nitrogen having a volume ratio of 3:1, spray cooling was immediately performed to a temperature of 25° C., to obtain silvery coiled tubing, where a rate of the spray cooling was 50° C./s.

(6) The silvery tubing cooled in step (5) passed through an intermediate frequency coil having a length of 50 cm in an atmosphere of nitrogen at a uniform velocity of 2 m/s, for rapid tempering, to heat the silvery tubing to 600° C.

(7) Water cooling as performed.

A structure of the silvery tubing obtained after the treatment of steps (4) to (7) was notably improved. Structures at respective positions of the welding seam region, the heat sensing region, and the tube wall of the tubing were more uniform and were refined. Their sizes were all less than 20 µm. A structure of the welding seam region was notably improved, so that the coiled tubing was more homogeneous overall.

Yield strengths at the three positions, namely, the welding seam region, the heat sensing region, and the tube wall, of the silvery tubing obtained by performing treatment of steps (4) to (7) on the laser-welded tubing were basically consistent and were all 875 MPa.

Examples 5 and 6

According to process steps of Example 1, temperatures of the tempering of step (6) were 720° C. and 800° C., and the rest steps were unchanged. Yield strengths at the three positions, the welding seam region, the heat sensing region, and the tube wall, of the silvery tubing obtained after the treatment were consistent and were respectively, 753 MPa and 492 MPa.

Comparative Example 1

Treatment was performed on the laser-welded coiled tubing prepared in steps (1) to (3) of Example 1 by using a thermal treatment process disclosed by the Chinese Patent No. 105458633B. Specific steps were as follows.

(1) Surface cleaning was performed on low-carbon alloy steel tubing whose size was Φ25.4 mm*2.8 mm (diameter*wall thickness) and whose mass percentages of chemical components were: C: 0.28%, Si: 0.20%, Mn: 1.80%, P: 0.010%, S: 0.005%, Cr: 0.80%, Mo: 0.60%, B: 0.0005%, Nb: 0.060%, Ti: 0.030%, V: 0.080%, and iron: the remainder, to remove a rustproof coating and surface impurities. Specifically, tubing sections were cleaned and degreased by using sodium dodecylbenzenesulfonate, were soaked in an aqueous solution of hydrochloric acid whose mass concentration was 15% for 10 s, to sufficiently remove the rustproof coating and impurities on the surface of the tubing, and finally, were ultrasonically cleaned by using water for 30 s.

(2) The cleaned tubing sections were butt-welded into one piece by using a laser welding method. A diameter of a facula of the laser welding was 2 mm, a welding power was 7000 W, a focal distance was 230 mm, a welding speed was 3 meter/minute, and during the welding, argon was used as a protective gas.

(3) A surface of a welding seam region of the laser-welded tubing was polished to be smooth. It was detected that yield strengths of strips at three positions, namely, the welding seam region, a heat sensing region, and a tube wall, of the coiled tubing were respectively 820 MPa, 700 MPa, and 730 MPa.

(4) A welding seam was normalized, and the coiled tubing was sized.

(5) Thermal treatment was performed on the whole coiled tubing, and a specific thermal treatment process was that: a temperature of the coiled tubing was raised to 920° C.; then, air cooling was performed, and after the air cooling, the temperature was controlled at 450° C.; and then, water cooling was performed at a cooling velocity of 150° C./s to the room temperature.

It was detected that the coiled tubing obtained by performing treatment using the process was in dark gray (gray tubing for short), and its surface was obviously oxidized. In addition, yield strengths of a welding seam region, a heat sensing region, and a base material of a tube wall of the coiled tubing after the treatment were inconsistent, where a yield strength of the welding seam region was 968 MPa, and yield strengths of the heat sensing region and the base material of the tube wall were respectively 859 MPa and 915 MPa. In view of this, notable heterogeneity existed in the welding seam region, the heat sensing region, and the tube wall of the coiled tubing, and seriously affected a service life of the coiled tubing.

Yield strengths, tensile strengths, and elongations of silvery tubing prepared according to Examples 1 to 6 and gray tubing prepared according to Comparative Example 1 were shown in Table 1.

TABLE 1

| | Yield strength/MPa | | | | |
| --- | --- | --- | --- | --- | --- |
| | Welding seam region | Heat sensing region | Tube wall | Tensile strength | Elongation |
| Example 1 | 1099 | 1099 | 1099 | 1156 | 8% |
| Example 2 | 1070 | 1070 | 1070 | 1106 | 12% |
| Example 3 | 973 | 973 | 973 | 986 | 14% |
| Example 4 | 875 | 875 | 875 | 895 | 20% |
| Example 5 | 753 | 753 | 753 | 793 | 24% |
| Example 6: | 492 | 492 | 492 | 615 | 36% |
| Comparative Example 1 | 968 | 859 | 915 | 980 | 14% |

It could also be seen from Table 1 that by the homogenization process of the present invention, homogeneous coiled tubing having different tensile strengths and yield strengths can be obtained by using same materials and only changing a temperature of tempering, and an outer surface of the tubing was unlikely to be oxidized. However, it would be difficult to achieve homogenized coiled tubing by using the treatment process of Comparative Example 1, and notable oxidization occurred when thermal treatment was performed on an outer surface of the coiled tubing, and performance thereof was greatly reduced.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention.

The embodiments described above are only descriptions of preferred embodiments of the present invention, and do not intended to limit the scope of the present invention. Various variations and modifications can be made to the technical solution of the present invention by those of ordinary skills in the art, without departing from the design and spirit of the present invention. The variations and modifications should all fall within the claimed scope defined by the claims of the present invention.

What is claimed is:

1. A homogenization process for coiled tubing, comprising:
    (1) making laser-welded low-carbon alloy steel coiled tubing pass through an annealing
    furnace at a uniform velocity, and performing heating and quenching and tempering in a mixed atmosphere of hydrogen and nitrogen, wherein a sectioned preheating region and a quenching and tempering region are sequentially disposed in the annealing furnace, a temperature of the sectioned preheating region ranges from 300° C. to 800° C., the sectioned preheating region of the annealing furnace is equally divided into six sections for preheating, a temperature of a first section is 300° C., a temperature of a second section is 400° C., a temperature of a third section is 500° C., a temperature of a fourth section is 600° C., a temperature of a fifth section is 700° C., and a temperature of a sixth section is 800° C., and a temperature of the quenching and tempering region ranges from 900° C. to 950° C.;
    (2) after the coiled tubing is heated and quenched and tempered, in the mixed atmosphere of hydrogen and nitrogen, immediately performing spray cooling to a temperature of 15° C. to 40° C., to obtain silvery coiled tubing, wherein a rate of the spray cooling ranges from 50° C./s to 80° C./s;
    (3) making the silvery coiled tubing cooled in step (2) pass through an intermediate frequency coil under protection of an atmosphere of nitrogen at a uniform velocity, to perform rapid tempering, wherein a color of the tempered silvery coiled tubing is kept unchanged, a length of the intermediate frequency coil is 50 cm, and the silvery coiled tubing is heated to a final temperature in a range from 400° C. to 520° C. during the rapid tempering; and
    (4) water cooling,
    wherein the silvery coiled tubing exhibits homogenization evidenced by having an identical yield strength across each of its various regions, including at least a welding seam region, a heat sensing region, and a tube wall, following the steps (1) through (4).

2. The homogenization process of claim 1, further comprising:
    performing surface cleaning on low-carbon alloy steel tubing sections to remove a rustproof coating and surface impurities;
    butt-welding the cleaned tubing sections into one piece by using a laser welding method, wherein a diameter of a facula of the laser welding is 2 mm, a welding power is 7000 W, a focal distance is 230 mm, a welding speed is 3 m/min, and during the welding, argon is used as a protective gas; and
    polishing a surface of the welding seam region of the laser-welded tubing to make it smooth.

3. The homogenization process of claim 2, wherein mass percentages of chemical components in the low-carbon alloy steel tubing are:
    C: 0.20% to 0.28%,
    Si: 0.12% to 0.20%,
    Mn: 1.00% to 1.80%,
    P: ≤0.015%,
    S: ≤0.005%,
    Cr: 0.30% to 0.80%,
    Mo: 0.20% to 0.60%,
    B: ≤0.0005%,
    Nb: 0.020% to 0.060%,
    Ti: 0.010% to 0.030%,
    V: 0.020% to 0.080%, and
    iron: a remainder of the mass percentage.

4. The homogenization process of claim 2, wherein, during the surface cleaning, the low-carbon alloy steel tubing is first degreased by using an anionic surfactant, then is soaked in a diluted acid for 10 s to 30 s, and finally, is ultrasonically cleaned by using water for 10 s to 30 s.

5. The homogenization process of claim 4, wherein the diluted acid is an aqueous solution of hydrochloric acid whose mass concentration ranges from 10% to 15%.

6. The homogenization process of claim 1, wherein a volume ratio of hydrogen and nitrogen in the mixed atmosphere in step (1) and step (2) is 3:1.

7. The homogenization process of claim 1, wherein a sprayed medium used in the spray cooling in step (2) is softened water, and its pH values ranges from 7 to 8.

8. The homogenization process of claim 1, wherein a temperature of the quenching and tempering region of the annealing furnace is 930° C.

* * * * *